United States Patent [19]

Diwell et al.

[11] 4,089,810

[45] May 16, 1978

[54] CATALYST

[75] Inventors: Alan Francis Diwell; William David James Evans, both of London, England

[73] Assignee: Johnson, Matthey & Co., Limited, London, England

[21] Appl. No.: 700,180

[22] Filed: Jun. 28, 1976

Related U.S. Application Data

[63] Continuation of Ser. No. 484,314, Jun. 28, 1974, Pat. No. 3,972,837.

[30] Foreign Application Priority Data

Aug. 20, 1973 United Kingdom .............. 39277/73

[51] Int. Cl.$^2$ ..................... B01J 23/10; B01J 23/58; B01J 23/64; B01J 23/50
[52] U.S. Cl. ................................. 252/462; 252/464; 252/465; 252/466 B; 252/466 PT; 252/468; 252/469; 252/470; 252/472; 252/473; 252/474; 423/213.5
[58] Field of Search .................. 252/462, 466 PT, 472, 252/473, 474, 464, 465, 466 B, 468, 469, 470; 423/213.5

[56] References Cited

U.S. PATENT DOCUMENTS

| | | | |
|---|---|---|---|
| 3,900,428 | 8/1975 | Mai et al. | 252/462 |
| 3,901,828 | 8/1975 | Mai et al. | 252/462 |
| 3,907,968 | 9/1975 | Kobylinski et al. | 423/213.5 |

*Primary Examiner*—W. J. Shine
*Attorney, Agent, or Firm*—Cushman, Darby & Cushman

[57] ABSTRACT

This invention relates to catalyst for use in the control of atmospheric pollution and, in particular to the purification of exhaust gases from internal combustion engines. Specific catalysts of the present invention comprise:

(a) ruthenium or an alloy thereof and a metal oxide capable of forming a stable mixed oxide (or "ruthenite") with ruthenium dioxide;

(b) a compound formed by ruthenium dioxide and a metal oxide capable of forming a stable mixed oxide (or "ruthenite") with ruthenium dioxide; and (c) a mixed oxide containing ruthenium, the oxide being selected from the group consisting of oxides of the pyrochlore type $A_2B_2O_7$, the perovskite type $ABO_3$, the ilmenite type $B_2O_3$ and the spinel type $AB_2O_4$.

Particularly good results have been obtained where the platinum/ruthenium ratio is within the range 25 – 95 wt.% platinum and 5 – 75 wt.% ruthenium.

2 Claims, No Drawings

CATALYST

This application is a continuation of application Ser. No. 484,314, filed June 28, 1974, now U.S. Pat. No. 3,972,837

This invention relates to catalysts for use in the control of atmospheric pollution. The catalysts of the present invention are particularly useful as reduction catalysts in the purification of the exhaust gases from internal combustion engines.

Unburned hydrocarbons, partially oxidised hydrocarbons, oxides of nitrogen and carbon monoxide contained in the exhaust gases from internal combustion engines, in addition to a wide variety of other organic compounds produced by well-established processes in the chemical industry, present serious problems of atmospheric contamination. For example, the oxide of nitrogen which is present in diesel exhaust gases is mainly nitric oxide. This is produced during the combustion of diesel fuel by the combination of nitrogen and oxygen at high temperatures and at pressures present in a combustion chamber. The presence of nitric oxide in exhaust gases is particularly hazardous when the engine is used in a confined space or when such engines are used in large numbers in geographical locations having special combinations of climatic conditions.

Hitherto it has been considered necessary to use a two-stage catalyst purification unit. In the first stage thereof the presence of excess hydrocarbon fuel components reduces the oxides of nitrogen to nitrogen and water and in the second stage thereof additional oxygen is supplied in the form of an air intake so as to oxidise the remaining hydrocarbon and carbon monoxide components to carbon dioxide and water.

Such a two-stage catalyst purification unit is not only expensive but there is also a tendency for the oxides of nitrogen to be reduced beyond the nitrogen-water stage to ammonia. Such a feature is clearly unacceptable even if part of the ammonia produced is re-oxidised in the second stage.

Under reducing conditions (i.e. a low air/fuel ratio) virtually 100% effective control of $NO_x$ can be achieved providing that the catalyst is one which substantially prevents ammonia formation.

As the air/fuel ratio increases however, $NO_x$ conversion efficiency decreases because chemisorption of NO is reduced by strong competition, from oxygen, for catalyst sites. However, if carburation can be controlled so that the air/fuel ratio is held more or less constant at or about the stoichiometric point, then, with a suitable catalyst system simultaneous conversion of carbon monoxide and hydrocarbons (by oxidation) and $NO_x$ (by reduction) can be achieved on a single catalyst bed.

It is an object of the present invention to provide such a catalyst system.

A solution to this problem has been proposed involving the use of a catalyst comprising a supported alloy of platinum, ruthenium and optionally base metal.

Under certain circumstances, however, it does appear that at the temperature of operation of automobile exhaust catalysts, certain alloys of ruthenium do not exhibit the necessary degree of stability. This is probably a result of ruthenium volatilization. Accordingly, it is one object of the present invention to provide automobile exhaust catalysts containing as catalytic metal alloys of ruthenium which are stable over longer periods at high temperatures. Another object of the present invention is to provide catalysts containing ruthenium for use in heterogeneous gas phase reactions which are stable at high temperatures.

A further object of the present invention is to decrease the loss of catalytic metal as a result of the gas flow transport which occurs in most ceramic honeycombs used as catalyst supports in automobile exhaust purification.

According to one aspect of the present invention a catalyst for use in the control of atmospheric pollution e.g. the oxidation or reduction of automobile exhaust fumes, comprises ruthenium or an alloy of ruthenium and a metal oxide capable of forming a stable mixed oxide (or "ruthenite") with ruthenium dioxide. The catalyst may comprise ruthenium or an alloy of ruthenium and a metal oxide selected from Group IIA of the Periodic Table (i.e. the alkaline earth group).

According to a second aspect of the invention, the catalyst comprises a compound formed by ruthenium dioxide and a metal oxide capable of forming a stable mixed oxide (or "ruthenite") with ruthenium dioxide. The catalyst may comprise a compound formed by ruthenium dioxide and a metal oxide selected from Group IIA of the Periodic Table.

Preferably, the metals of Group IIA are magnesium, calcium, strontium and barium and, of these, we particularly prefer barium.

The ruthenium (or alloy or compound of ruthenium) may be deposited by any known method upon, for example, a high surface area intermediate refractory metal oxide and an inert unitary porous refractory ceramic honeycomb as ultimate support.

Preferably, the inert unitary porous refractory ceramic honeycomb has applied thereto as a first coating, layer or deposit of a refractory oxide and, to the first coating, layer or deposit by impregnation or otherwise, of the compound of ruthenium as specified above. Alternatively the material forming the first coating, layer or deposit may be pre-coated or pre-impregnated with the said alloy as specified, prior to the application thereof to the inert material which forms the ultimate support.

Another catalyst according to the present invention comprises a mixed oxide containing ruthenium which is selected from the group of oxides consisting of the pyrochlore type $A_2B_2O_7$, the perovskite type $ABO_3$, the ilmenite type $B_2O_3$, and the spinel type $AB_2O_4$.

A represents one or more of the cations derived from the group consisting of Na, K, Ca, Sr, Ba, Ag, Cd, Hg, Pb, Bi, Y and rare earths.

B represents $Ru^{4+}$ and optionally one or more of the cations derived from the group consisting of Li, Mg, Cr, Nb, Pd, As, Au, Ga, In, Rh, Sb, Sc, Ti, Hf, Ir, Mo, Os, Pt, Re, Sn, Zr, W, Ta, Mn (i.e. $Mn^{4+}$), Fe (i.e. $Fe^{3+}$), V and Co (i.e. $Co^{3+}$).

Preferably the proportion of B (i.e. $Ru^{4+}$) in the mixed oxide is not less than 5 atomic percent and may range up to 100%. Thus formulae of mixed oxides according to the present invention containing the minimum quantity of Ru are:

$A_2 B'_{1.95} Ru_{0.05} O_7$;

$A B'_{0.95} Ru_{0.05} O_3$;

$B'_{0.95} Ru_{0.05} O_3$; or $A B'_{1.95} Ru_{0.05} O_4$ where B' may be one or more of the cations as defined above other than $Ru^{4+}$.

Formulae containing the maximum quantity of ruthenium are:

$A_2Ru_2O_7$;
$A Ru O_3$;
$B^1_{2/3} Ru_{4/3} O_3$; or
$A B^1_{1/3} Ru_{5/3} O_4$ where A and $B^1$ are as defined above.

Dispersion of mixed oxide catalysts according to the present invention may be deposited upon supports by methods well known in the art. For example, an inert unitary porous refractory ceramic honeycomb having a high surface area catalytically active refractory metal oxide coating may have a dispersion pumped into it and this followed by drying and calcining. Similar methods may be used for depositing the mixed oxides on pellets, granules, spherules, powder shaped extrudates, nichrome wire. Suitable materials which may be used to constitute the ceramic support are zircon-mallite, mullite, alpha alumina, sillimanite, magnesium silicates, kaolin clays, zircon, petalite, spodumene, cordierite and most alumino-silicates.

Proprietary products which may be used are described in Talsma U.S. Pat. Nos. 3,397,154, Stiles 3,498,927 and British Pat. No. 882,484. Examples are "TORVEX", a mullite honeycomb having eight corrugations per inch and an alumina washcoat; "THERMACOMB", a cordierite honeycomb supplied by the American Lava Corporation; and Ex 20, a cordierite honeycomb supplied by Corning Glass.

A surface area of at least 600 sq. ft. per cubic ft. of washcoated honeycomb is preferred. A water porosity ranging from 15–40% is suitable with 25% preferred. At least 10% of the micropores should have a diameter greater than 10 microns and 90% greater than 10 microns is preferred.

The optimum quantity of mixed oxide which must be deposited on a ceramic honeycomb support is that which gives 10 grams of ruthenium (as metal) per cubic feet of support.

According to a further feature of the present invention, therefore, a catalyst comprises an inert unitary porous ceramic honeycomb having a first or intermediate coating of a high surface area catalytically active refractory metal oxide and a second layer deposited upon the first layer comprising a mixed oxide containing ruthenium which is selected from the group of oxides consisting of the pyrochlore type $A_2B_2O_7$, the perovskite type $ABO_3$, the ilmenite type $B_2O_3$ and the spinel type $AB_2O_4$ in which A and B have the meanings as herein defined.

Catalysts according to the present invention have successful application in other catalytic reactions, particularly those in which ruthenium metal (or alloy of ruthenium) is considered to be a useful catalyst. Examples of such reactions are methanation, the Fisher-Tropsch reaction, steam reforming of naphtha and the synthesis of ammonia.

EXAMPLE 1

The pH of a solution containing ruthenium and an alkaline earth metal — both metals present as the chloride — was increased in order to precipitate the ruthenium and alkaline earth metal as hydrated oxide. The hydrated oxide was then dried and ignited at 600° C. In order to convert the ignited precipitate to mixed oxide the product was further heated at 1,000° C for 2 hours.

Three grammes of the mixed oxide was then placed in a one inch diameter tube and kept at 1200° C. for 40 hours during which air was passed over the product at a rate of 10 scfn. After allowing to cool, the final product was re-weighed and analysed. The following results were obtained given as Ru loss in mgm per $cm^2$ per hour. Examples of mixed oxides (ruthenites) prepared in this manner were:

|  | Ru loss mgm/$cm^2$ $hr^{-1}$ |
|---|---|
| $CaRuO_3$ ($CaO.RuO_2$) | 0.650 |
| $MgRuO_3$ ($MgO.RuO_2$) | — |
| $BaRuO_3$ ($BaO.RuO_2$) | 0.054 |
| $SrRuO_3$ ($SrO.RuO_2$) | 0.151 |
| $SrRuO_3$ + 50% excess SrO | 0.016 |
| $CaRuO_3$ + 50% excess CaO | 0.067 |

This should be compared with a weight loss for Ru metal + 25% CaO of 1.97 mgm/$cm^2$ $hr^{-1}$.

Tests under actual oxidising conditions in an exhaust catalyst show that Mg performs better than Ca. Comparative tests were carried out with Ru - Pt alloys. Ru - Pt under total oxidising conditions at 700° C. loses its $NO_x$ reduction capacity in 45–60 minutes. The $CaRuO_3$ system lasts 60 hours. The $MgRuO_3$ system lasts at least 120 hours.

EXAMPLES 2 to 12

Catalyst Evaluation

The standard test used to evaluate catalysts, some of which are included for comparative purposes, is to pass simulated exhaust gas over the sample at a fixed inlet temperature and to measure the conversion efficiency of CO, HC and NOx and $NH_3$ formation at various oxygen concentrations in the range 0–3% (v/v). In some cases conversion efficiency versus inlet temperature data are also included.

The performances of all catalysts examined are illustrated in Examples 2 to 12 and the test conditions are as follows:

| Gas composition | CO | = 4% |
|---|---|---|
|  | NO | = 2000 ppm |
|  | $CH_4$ | = 500 ppm |
|  | $H_2O$(g) | = 2.5% |
|  | $O_2$ | = 0-3% |
|  | $N_2$ | = balance |
| Space velocity | = | $2 \times 10^5$ $hr^{-1}$ |
| Bed depth | = | 1" |
| Bed diameter | = | 1.9" |
| Inlet temperature | = | 450° C. |
| Pressure | = | 1 atmosphere |

Results

The results are summarised in Table 1.

TABLE 1

| Example No. | Catalyst System | % NOx conversion at 2.0% $O_2$ | % NOx conversion at 2.5% $O_2$ |
|---|---|---|---|
| 2 | (35% Ru/Pt) | 28 | 6 |
| 3 | 100% Ru | 0 | 0 |
| 4 | $BaRuO_3$ - aqueous dispersion | 16 | 0 |
| 5 | $BaRuO_3$ - disc-milled/Celacol | 11 | 4 |
| 6 | $BaRuO_3$ - ball-milled/Celacol | 20 | 7 |

TABLE 1-continued

| Example No. | Catalyst System | % NOx conversion at 2.0% $O_2$ | % NOx conversion at 2.5% $O_2$ |
|---|---|---|---|
| 7 | $BaRuO_3$ - pre-impregnated | 46 | 5 |
| 8 | $MgO/RuO_2$ - pre-impregnated | 20 | 6 |
| 9 | $BaRuO_3$ - aqueous impregnation | 55 | 7 |
| 10 | $BaRuO_3/Pt$ - pre-impregnated | 87 | 24 |
| 11 | $MgO/RuO_2/Pt$ - pre-impregnated | 68 | 37 |
| 12 | "$BaRu_{0.39}Pt_{0.61}O_3$"- aqueous impregnation | 63 | 22 |

In the examples the loadings of ruthenium were limited to $10_g$ ft$^{-3}$. All catalysts have been supported on "THERMACOMB" (Registered Trade Mark) manufactured by American Lava and washcoated with Johnson, Matthey standard C-type alumina washcoat. Alternative supports may be used, however, for example, corrugated metallic substrates.

Example 2 shows the performance of the 1st generation NOx reduction catalyst (35% Ru/Pt at a metal loading of 40g.ft.$^{-3}$). NOx conversion efficiency falls as the stoichiometric point for oxidation of CO (2% oxygen) is approached. At this point NOx conversion is low (28%). At low oxygen concentrations the ammonia formation level is high, which is a great disadvantage for a NOx catalyst in a dual-bed system, since this ammonia is oxidised back to NOx by the oxidising catalyst. For a single-bed system, however, this is not a problem since the carburation would be controlled so that the catalyst would be operating around the stoichiometric point where ammonia formation is low.

Example 3 shows the performance of a catalyst made by coating the standard washcoated substrate with a dispersion of ruthenium at a loading of 40g.ft.$^{-3}$. Here, it is noticeable that NOx conversion efficiency has fallen to zero, even before the stoichiometric point is reached. Conversion of CO is much lower than for the 35% Ru/Pt system and no oxidation of methane takes place. Formation of ammonia is, however, almost negligible.

Example 4 shows the performance of a stabilised ruthenium mixed oxide system, $BaRuO_3$ (barium ruthenite). The $BaRuO_3$ was prepared by calcination of a mixture of barium peroxide plus ruthenium sponge at 1000° C. This was then ground using a mortar and pestle and dispersed, as well as was possible, in water. The aqueous dispersion was then pumped through the substrate. Owing to the low surface area and poor dispersion of the particles, catalytic activity is low. NOx conversion at 2% $o_2$ is also low although it is higher than obtained with the pure ruthenium system.

Examples 5 and 6 show the performances of $BaRuO_3$ systems designed to improve upon the low surface area and the poor dispersion above. A suspending agent, 0.5% Celacol solution, was used in place of water, and various milling techniques were used on the barium ruthenite — as indicated. Conversion efficiency was improved slightly by these treatments but NOx conversion in the oxidising region was of the same order.

It was also attempted to improve the dispersion by pre-mixing an alumina washcoat with milled $BaRuO_3$ and using this to coat standard washcoated substrate. This further reduced conversion efficiency of NOx and CO although it is noticeable that there is 46% conversion of NOx at 2% $O_2$ (Example 7).

An earlier attempt to stabilise ruthenium by forming $MgRuO_3$ actually resulted in an intimate mixture of $MgO + RuO_2$ — with no mixed oxide formed. This was also preimpregnated in an outer washcoat and the performance is shown in Example 8.

In view of the lack of activity shown by the above stabilised systems, it was decided to attempt to form $BaRuO_3$ in situ, by immersing the substrate in an aqueous solution of barium nitrite and "ruthenium nitrosyl nitrite" (produced by Johnson, Matthey Chemicals Ltd.), then drying and firing at 600° C. The performance of this catalyst is shown in Example 9. NOx conversion is higher than shown in Examples 4 to 7 and the value at 2% $O_2$ is about 50%.

The effect of adding platinum to the last three systems mentioned can be seen in Examples 10, 11 and 12. Colloidal platinum plus either barium ruthenite or an intimate mixture of $MgO/RuO_2$ (co-precipitated) was stirred into an alumina washcoat and this was used to treat samples of fired, washcoated Thermacomb. This technique has the effect of distributing the catalyst sites throughout the upper layer of alumina. In the third case, platinum nitrate in nitric acid was added to an aqueous solution of barium nitrite and "ruthenium nitrosyl nitrate", and the resultant solution used to impregnate the washcoated Thermacomb. In all three cases a platinum loading of 30g.ft.$^{-3}$ was used — comparable with the 35% Ru/Pt system. All of these systems show considerably greater NOx conversion in the oxidising region than do the corresponding non-platinum systems.

It is clear that platinum has a beneficial effect upon NOx conversion in the oxidising region. The $BaRuO_3$ catalyst, prepared by aqueous impregnation, also shows good NOx conversion at 2% $O_2$. On studying the results for the $BaRuO_3$ systems, it can be seen that the better the dispersion of particles, the greater is the ability of the system to catalyse NOx reduction under oxidising conditions.

We have found that the platinum/ruthenium ratio may vary within the range 25 - 95 wt.% platinum and 5 - 75 wt.% ruthenium.

EXAMPLE 13

The following catalysts were prepared and used for catalysing the reduction of oxides of nitrogen with carbon monoxide in a simulated automobile exhaust gas.

| Constituents of Simulated Exhaust Gas | % By Volume |
|---|---|
| Carbon monoxide | 4.0 |
| Steam | 2.5 |
| Oxygen | 0.4 |
| Nitric oxide | 0.2 |
| Methane | 0.05 |
| Nitrogen | Balance |

The catalysts were then aged at 950° C. in air for 16 hours (Systems I and II) and the tests repeated. The System III catalyst was aged by exposing to a Honda engine exhaust running under oxidising conditions for 30 hours.

Preparation of System I: MgRuO₃ catalyst 0.04 mol magnesium chloride hexahydrate and 0.04 mol ruthenium trichloride were dissolved in 200 cm$^3$ water, and the solution heated to 85° C. Sodium hydroxide solution was added until the pH of the solution was 11. The precipitate was filtered, washed with water and dispersed in 21 cm$^3$ water. The dispersion was then pumped through pieces of alumina-washcoated substrate. After drying at 150° C., the pieces were fired at 450° C. in air. Each piece of treated substrate contained 0.05% ruthenium.

Preparation of System II: BaRuO₃ catalyst

Equimolar proportions of barium peroxide and ruthenium sponge were fired at 1000° C. for 18 hours. The product was ground and then ball-milled in water. The milled barium ruthenite dispersion (0.1 mol BaRuO$_3$ in 3.5.1 water) was pumped through the pieces of substrate, and after drying at 150° C., the pieces were fired at 450° C. in air. The pieces of treated substrate contained 0.05% ruthenium.

Preparation of System III: BaRuO₃ catalyst 0.01 mol barium nitrate and 0.01 mol of ruthenium nitrosyl nitrite were dissolved in 220 cm$^3$ water. Substrate was impregnated with this solution, then dried at 150° C. and fired at 600° C. for 2 hours in air. The treated substrate contained 0.06% ruthenium.

The results for percentage conversion of NOx and ammonia formation before and after ageing are given in FIGS. 1 to 3. They should be compared with the after ageing performance of an unstabilised ruthenium catalyst, FIG. 4.

Percentage conversion of NOx is given on the left hand scale and should be as high as possible and ammonia formation in parts per million is given on the right hand scale (dahsed line plots). This, of course, should be as low as possible.

What we claim is:

1. A catalyst comprising an inert unitary porous ceramic honeycomb having a layer of a first coating of a high surface area catalytically active refractory metal oxide and a second layer deposited upon said first layer, said second layer comprising a catalytically active mixed oxide containing ruthenium selected from the group consisting of oxides of the pyrochlore type A$_2$B$_2$O$_7$, the perovskite type ABO$_3$, the ilmenite type B$_2$O$_3$, and the spinel type AB$_2$O$_4$, wherein A represents one or more of the cations derived from the group consisting of Na, K, Ca, Sr, Ba, Ag, Cd, Hg, Pb, Bi, Y and rare earths;

B represents Ru$^{4+}$ and at least one other platinum group metal cation.

2. A catalyst comprising an inert unitary porous ceramic honeycomb having a layer of a first coating of a high surface area catalytically active refractory metal oxide and a second layer deposited upon said first layer, said second layer comprising a catalytically active mixed oxide containing ruthenium selected from the group consisting of oxides of the pyrochlore type A$_2$B$_2$O$_7$, the perovskite type ABO$_3$, the ilmenite type B$_2$O$_3$, and the spinel type AB$_2$O$_4$, wherein A represents one or more of the cations derived from the grup consisting of Na, K, Ca, Sr, Ba, Ag, Cd, Hg, Pb, Bi, Y and rare earths;

B represents Ru$^{4+}$ and at least one other cation from the group consisting of: Li, Mg, Cr, Nb, Pd, As, Au, Ga, In, Ln, Rh, Sb, Sc, Ir, Os, Pt, Re, Ta, Fe and Co.

* * * * *